United States Patent
Langensiepen et al.

(10) Patent No.: US 11,214,445 B2
(45) Date of Patent: Jan. 4, 2022

(54) CONVEYOR ROLLER WITH CONICAL TAPERED ELEMENT

(71) Applicant: INTERROLL HOLDING AG, Sant' Antonino (CH)

(72) Inventors: Dominik Langensiepen, Wermelskirchen (DE); Armin Lindholm, Wermelskirchen (DE)

(73) Assignee: INTERROLL HOLDING AG, Sant' Antonino (CH)

( * ) Notice: Subject to any disclaimer, the term of this patent is extended or adjusted under 35 U.S.C. 154(b) by 201 days.

(21) Appl. No.: 16/470,993

(22) PCT Filed: Dec. 15, 2017

(86) PCT No.: PCT/EP2017/083022
§ 371 (c)(1),
(2) Date: Jun. 19, 2019

(87) PCT Pub. No.: WO2018/114668
PCT Pub. Date: Jun. 28, 2018

(65) Prior Publication Data
US 2020/0024076 A1 Jan. 23, 2020

(30) Foreign Application Priority Data
Dec. 21, 2016 (DE) ...................... 10 2016 125 136.4

(51) Int. Cl.
*B65G 39/07* (2006.01)
(52) U.S. Cl.
CPC .................. *B65G 39/07* (2013.01)

(58) Field of Classification Search
CPC .................................................... B65G 39/07
See application file for complete search history.

(56) References Cited

U.S. PATENT DOCUMENTS

| 3,221,868 A | * | 12/1965 | Ricker | B65G 39/04 198/824 |
| 5,136,766 A | * | 8/1992 | Savitz | B21B 31/074 492/1 |
| 6,523,665 B2 | | 2/2003 | Nimmo et al. | |
| 7,299,909 B1 | | 11/2007 | Houghton | |
| 2002/0074208 A1 | | 6/2002 | Nimmo et al. | |

FOREIGN PATENT DOCUMENTS

| DE | 3940744 A1 | * | 6/1991 | F26B 13/14 |
| JP | 2011037576 | | 2/2011 | |
| JP | 5603035 B2 | | 10/2014 | |
| WO | WO-2010079839 A1 | * | 7/2010 | B65G 15/02 |
| WO | 2015034421 | | 3/2015 | |

* cited by examiner

*Primary Examiner* — Sarang Afzali
(74) *Attorney, Agent, or Firm* — Price Heneveld LLP (57) ABSTRACT

A conveyor roller for conveying systems for conveying articles comprises a cylindrical roller body having a rotation axis, the cylindrical roller body being provided for the rotatable assembly in a frame or the like, wherein one or a plurality of substantially frustoconical sleeves is/are disposed on the cylindrical roller body. The cylindrical conveyor roller includes a positioning installation by which the frustoconical sleeve is axially fixed at least along the rotation axis in at least one direction, wherein the positioning installation comprises a protrusion which axially extends in a radially outward manner on the cylindrical roller body and which extends into a clearance that is configured in the frustoconical sleeve.

4 Claims, 5 Drawing Sheets

CONVEYOR ROLLER WITH CONICAL TAPERED ELEMENT

CROSS-REFERENCE TO FOREIGN PRIORITY APPLICATION

The present application claims the benefit under 35 U.S.C. §§ 119(b), 119(e), 120, and/or 365(c) of PCT/EP2017/083022 filed Dec. 15, 2017, which claims priority to German Application No. 102016125136.4 filed Dec. 21, 2016.

FIELD OF THE INVENTION

The invention relates to a conveyor roller for conveyor systems for conveying containers, pallets and the like, having a cylindrical roller body having a rotation axis, said cylindrical roller body being provided for the rotatable assembly in a frame or the like, wherein one or a plurality of substantially frustoconical sleeves is/are disposed on the roller body. The invention furthermore relates to a production method for conveyor rollers of this type.

BACKGROUND OF THE INVENTION

Conveyor rollers of this type are used for various purposes in logistics applications. Said conveyor rollers can thus be used, for example, in the conveying of pallets, in the conveying of parcels in parcel distribution centers, for conveying containers in warehouses of different kinds, or for transporting baggage at airports and in numerous other applications. Such conveyor rollers herein are typically used in conveying sections which are composed of a plurality of rollers disposed beside one another, the upper circumferential face of said rollers serving in each case for receiving the conveyed goods. Idler rollers which are not driven and are mounted so as to only be rotatable in a conveyor frame are disposed in said conveying sections, on the one hand. Furthermore, driven conveyor rollers which are motor-operated and are set in rotation by an electric drive unit are disposed in said conveying sections. Said motor-operated conveyor rollers are constructed in such a manner that the drive unit is disposed within the roller per se such that no mechanical components, disposed outside the roller body, are required for generating the rotation of the roller. The motor-operated conveyor rollers serve for transporting the conveyed goods directly across the external circumferential face of the roller body of said conveyor rollers, on the one hand; on the other hand, by means of transmitting the rotation of the motor-operated conveyor roller to one or a plurality of idler rollers by means of a transmission element, for example, a belt drive. The idler rollers can also be set in rotation by the motor-operated conveyor roller so as to drive the conveyed goods by way of the external circumferential face of said idler rollers.

Conveyor rollers which are provided with at least one frustoconical sleeve are used for implementing curves in such conveying sections. When a conveyor belt is guided around a curve, a plurality of such roller bodies having frustoconical sleeves are to be provided in order for the belt to be guided in a corresponding manner. Conveyor rollers in which the roller body per se is configured in an overall conical manner are known herein. The subject matter of the invention, however, relates to conveyor rollers in which the roller body per se is substantially cylindrical and one or a plurality of frustoconical sleeves are disposed on the shell face of said roller body.

Such an arrangement is known from U.S. Pat. No. 7,299,909 B1. In the case of the device disclosed therein, the frustoconical sleeve on the inside is embodied so as to be hollow and has a plurality of support rings which have a substantially cylindrical breakthrough such that the frustoconical sleeve by way of the rings can be supported on the external circumferential face of the roller bodies. However, in the case of such rollers it is problematic that the sleeve at high forces which act on the oblique face of the frustoconical sleeve as well as at high speed can be displaced counter to the tight fit thereof, and incorrect loading of, as well as damage to, the conveyor roller can thus arise. Goods to be conveyed can also be damaged on account thereof when the belt profile is displaced by virtue of the displacement of the frustoconical sleeve.

A conveyor roller that is improved in relation to the above is disclosed in U.S. Pat. No. 6,523,665 B2 (US 2002/0074208 A1). In the case of the conveyor roller disclosed therein, which is not motor-operated, the frustoconical sleeves which are push-fitted onto the cylindrical roller body are formed from a solid material and are fastened by way of a tight fit. Said sleeves are formed from a plastics material. In order for the axial position to be even better established, a tension sleeve placed in a bore which extends through the frustoconical sleeve as well as through the roller body is provided. Said tension sleeve is driven in by means of a hammer so that the axial position of the frustoconical sleeve is established.

However, this construction has also proven to be problematic such that the demand for improvements continues to exist. The conveyor roller according to the invention is in particular also to be used in the food-processing industry.

The invention achieves the object of the individual conveyor roller of the type mentioned at the outset in that a positioning installation by means of which the sleeve is axially fixed at least along the rotation axis and in the direction of the cone tip of said sleeve is provided, wherein the positioning installation comprises a protrusion which extends in a radially outward manner on the roller body and which extends into a clearance that is configured in the sleeve.

The cone tip refers to the constricted portion of the frustoconical sleeve. The cone opening correspondingly refers to the widened portion of the frustoconical sleeve. The support of forces in the direction of the cone opening in terms of construction can be achieved in a simple manner by way of a ring or a cover cap on the roller body. However, the support toward the cone tip has to date been problematic. Since the sleeve at the cone tip thereof has a diameter which almost corresponds to the diameter of the roller body, a support at this location has traditionally been achieved by means of a friction fit. However, the problem of the sleeve being able to be released, for example, when abrupt forces act on the sleeves by virtue of conveyed goods being conveyed in a non-uniform manner, also existed herein.

The invention is based on the concept that an embodiment, as disclosed in U.S. Pat. No. 6,523,665 B2 (US 2002/0074208 A1), does indeed function in principle but is less suitable for use in the food-processing industry. Conveyor rollers are typically lubricated using oil or grease in order for the friction to be reduced. The use of a tension sleeve which has a central passage establishes a connection between the interior space of the roller body and the environment and can thus lead to oil or grease from the interior space making its way into the environment and also into food to be conveyed. This is unacceptable in the food industry. While it is indeed conceivable in principle for such a tension sleeve to be sealed for this purpose, there is here, however, also the risk that the seal is not tight or is released when in operation, by virtue of temperature variations and centrifugal forces. Moreover, maintenance of the seal is complex. Moreover, media, in particular cleaning liquids, can invade the roller by way of the passage or the seal, respectively, and can cause damage to bearings or other components.

SUMMARY OF THE INVENTION

The invention, therefore, proposes a positioning installation which comprises a protrusion which extends in a radial manner on the roller body and which extends into a clearance that is configured in the sleeve. A connection between the interior space and the environment is avoided on account thereof, and the closed roller body is not violated, the internal surface of the roller body, in particular, not being rendered permeable. The protrusion extends in an outward manner and into a clearance on the sleeve in such a manner that the sleeve is axially fixed at least along the rotation axis, thus in the axial direction, and in the direction of the cone opening of said sleeve. A permanent axial fixing is achieved on account thereof, said fixing also being able to withstand comparatively high forces without establishing a connection between the interior space of the roller body and the environment.

In one further preferred embodiment the positioning installation fixes the sleeve in a form-fitting manner. This is particularly preferable since a defined position of the sleeve on the roller body is achieved on account thereof.

In one preferred refinement the protrusion is connected to the roller body by means of a welded connection. Alternatively, the protrusion can be molded so as to be integral on the roller body. It is important that the protrusion does not extend into the interior of the roller body in such a manner that a connection to the environment is established. The connection of the protrusion to the roller body by means of a welded connection is particularly preferable since the roller bodies can thus, in principle, be produced as interchangeable parts and a respective protrusion is attached according to requirements, when a frustoconical sleeve is to be push-fitted.

The protrusion is preferably inserted in a clearance in the roller body. The protrusion is preferably configured as a separate component, for example, as a disk, pin, rectangular block, partially-cylindrical element, or the like. The protrusion is preferably configured as a metal element. According to this embodiment, however, a clearance which does not extend into the interior space is provided in the roller body. The clearance is thus configured as a groove having a groove base. The protrusion in such a case can be configured in the manner of a feather key. On account thereof, apart from the welding, or, as an alternative thereto, a form-fitting connection is achieved between the protrusion and the roller body. A form-fitting connection between the sleeve and the protrusion is achieved at the same time. A form-fitting connection between the sleeve and the roller body is achieved overall in this way. In such a case, additional fastening means such as, for example, welding or adhesive bonding, can be dispensed with.

In one preferred refinement the clearance in the sleeve is configured as a through bore. The manufacturing is simplified on account thereof. The sleeve can thus first be push-fitted onto the roller body, and the protrusion is subsequently inserted from the outside into the through bore in the sleeve. Depending on the design of the roller body, the protrusion can then extend into the roller body and into the clearance or the groove, respectively. Alternatively, in as far as the roller body does not have such a groove, the protrusion is subsequently preferably welded to the roller body. To this end, it is preferably provided that the protrusion is connected to the roller body by means of resistance welding. This type of welded connection is particularly expedient in this case since the weld seam, in the case of resistance welding, does not have to be directly accessible. Rather, it is sufficient in this case for corresponding electrodes to be placed on the internal side of the roller body as well as on the external side of the protrusion such that a welded connection is produced at the contact face between the protrusion and the external wall of the roller body.

However, the clearance in the sleeve can also be configured as an axially open clearance on a peripheral portion of the sleeve, preferably at the cone tip, such that the protrusion is first connected to the roller body and the sleeve is then axially displaced toward the protrusion such that the protrusion engages in the axially open clearance. The clearance in one variant is preferably formed so as to be L-shaped which results in a portion that can be engaged from behind. The assembly is then first performed by axial pushing and subsequent rotating so as to move the protrusion into the leg of the L which is aligned perpendicularly to the longitudinal axis.

In one preferred refinement the clearance and the protrusion are disposed in the constricted region of the frustoconical sleeve, in other words, at the end toward the cone tip. This is particularly preferable when the clearance in the sleeve is configured as a through bore. In this case, the protrusion can be configured so as to be small, on account of which resistance welding is also simplified. The clearance and the protrusion, when viewed from the constricted end side, are preferably disposed in the first third, preferably in the first quarter, in the first fifth, in the first sixth, particularly preferably in the first seventh of the longitudinal extent of the sleeve.

In one alternative thereto, the clearance and the protrusion are disposed in the widened region of the frustoconical sleeve, in other words, at the end toward the cone opening. It is again preferable that the protrusion and the clearance, when viewed from the end side of the cone opening, are disposed in the first third, preferably in the first quarter, in the first fifth, in the first sixth, particularly preferably in the first seventh. This variant is preferable when the clearance in the sleeve is not configured as a through bore, but, in particular, as an axially open clearance which from an internal circumferential face of the sleeve extends in a radially outward manner.

In the case of such an embodiment it is furthermore particularly preferable for the clearance and the protrusion to be radially covered by a second frustoconical sleeve which adjoins the first frustoconical sleeve on the roller body. Depending on the embodiment, two or more of such frustoconical sleeves can be disposed behind one another and mutually overlap in the manner of a telescope in a contact region. This means that the portion of the cone opening in a radially external manner is overlapped by a constricted region of a second axially neighboring sleeve. The connection of the sleeves can be performed by way of known form-fitting of friction-fitting means. In this variant, the clearance in the sleeve is preferably disposed in that portion of the cone opening that in a radially external manner is overlapped by the second sleeve. This has the advantage that the protrusion in a radially external manner is not visible, thus also cannot come into contact with conveyed goods or a belt disposed on the conveyor roller, and the conveyed goods or the belt are thus not additionally stressed. Such an arrangement furthermore offers an assembly safeguard should the protrusion not be fixedly connected to the roller body.

In a second aspect, the invention achieves the object by way of a production method of the type mentioned at the outset, comprising the following steps: providing or producing a roller body; disposing a frustoconical sleeve on the roller body; and axially establishing the sleeve at least along the rotation axis and in the direction of the cone tip of said sleeve. It is to be understood that the conveyor roller according to the first aspect of the invention and the production method according to the second aspect of the invention have a multiplicity of common subsidiary aspects such as are in particular set forth in the dependent claims. To this extent, in terms of preferred embodiments, the features and advantages thereof, reference is made to the full extent of the description above.

Furthermore, the step of establishing preferably comprises: inserting a protrusion into a clearance in the sleeve such that the protrusion is in contact with the roller body. To this end, a passage opening is first configured in the sleeve such that the protrusion is inserted through the passage opening in the sleeve into the clearance so as to come into contact with the roller body.

Furthermore, the method preferably comprises the step: resistance welding the protrusion to the roller body. This step is preferably carried out after the inserting of the protrusion into the clearance in the sleeve.

Alternatively or additionally, the establishing step comprises the step: inserting the protrusion into a clearance of the roller body. The resistance welding can be dispensed with in this variant, but said resistance welding can also be carried out for the purpose of an additional safeguard. The protrusion is again preferably inserted through the passage opening in the sleeve. Alternatively, the protrusion is first inserted into the sleeve of the roller body and the sleeve is subsequently push-fitted in such a manner that the protrusion can engage in a corresponding clearance on the sleeve.

In one preferred refinement the production method furthermore comprises the steps: disposing a second frustoconical sleeve on the roller body so as to axially neighbor the first sleeve; and covering the protrusion by means of the second sleeve.

BRIEF DESCRIPTION OF THE DRAWINGS

The invention will be explained in more detail hereunder by means of two exemplary embodiments with reference to the appended figures in which.

DETAILED DESCRIPTION OF THE EMBODIMENTS

A conveyor roller 1 according to the invention for conveying containers, pallets and the like has a cylindrical roller body 2. The roller body 2 has a rotation axis Z, the roller body 2 being capable of being assembled so as to be rotatable about the rotation axis Z in a frame or the like. To this end, the conveyor roller 1 has a first end 4 and a second end 6, wherein a connector piece 8 which is provided for transmitting drive moments to neighboring conveyor or drive rollers is provided in the first end 4. A corresponding connector piece 60 (see, FIGS. 6 and 8) can also be provided on the second end 6. Alternatively, another connector piece is disposed on the end 6, for example, a connector piece of an internal drive when the conveyor roller 1 is configured as a motor-operated conveyor roller or as a drum motor.

The conveyor roller 1 according to the present embodiment is mainly used in roller curves so as to convey conveyed goods uniformly through the curve and to not carry the conveyed goods toward the inside or the outside of the curve. To this end, different circumferential speeds on the external circumference of the conveyor roller 1 are implemented by frustoconical sleeves 12, 14, 62, 64 (see FIGS. 6, 8). The different circumferential speeds then drive the conveyed goods in a manner corresponding to the actual curve radius of the conveyed goods and enable a uniform travel of the conveyed goods through the roller curve.

Specifically, the conveyor roller 1 according to the present embodiment (FIG. 1) is equipped with two frustoconical sleeves 12, 14 that are disposed behind one another, and on the circumferential face 10 of the roller body 2 has the first frustoconical sleeve 12 and the second frustoconical sleeve 14. The second frustoconical sleeve 14 axially adjoins the first frustoconical sleeve 12 and is disposed so as to neighbor the latter. Each of the frustoconical sleeves 12, 14 has a constricted portion 16, 18 as well as a cone opening 20, 22. In order for a substantially overall uniform gradient to be achieved, the constricted portion 18 of the second frustoconical sleeve 14 has a diameter that is approximately identical to that of the portion having the cone opening 20 of the first frustoconical sleeve 12. It is to be understood that further frustoconical sleeves 62, 64 can be provided on the roller body 2, as is, in particular, illustrated in FIGS. 6 to 9. To this extent, the third frustoconical sleeve 62 can adjoin the cone opening 22 of the second frustoconical sleeve 14 in such a manner that the constricted portion of the third frustoconical sleeve 62 then has a diameter which approximately corresponds to the diameter of the cone opening 22 of the second frustoconical sleeve 14, as will also be described further below. The exact number of frustoconical sleeves 12, 14, 62, 64 depends on the width of the conveyor belt which is to run on the conveyor roller 1, on the roller curve, as well as on the axial length of the roller body 2.

Figure 2:
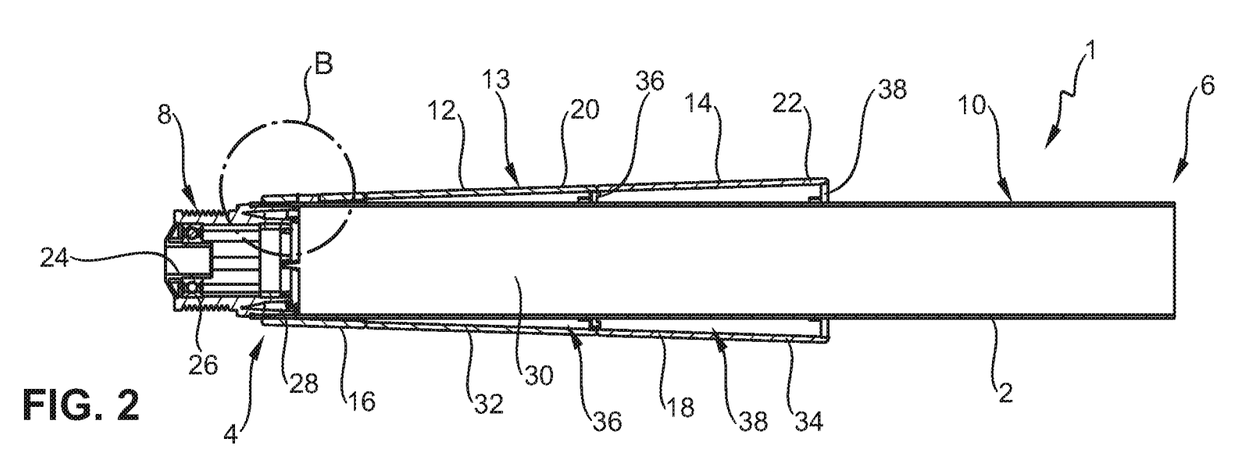
FIG. 2 is a cross section through the conveyor roller according to a first exemplary embodiment.
Figure 3:
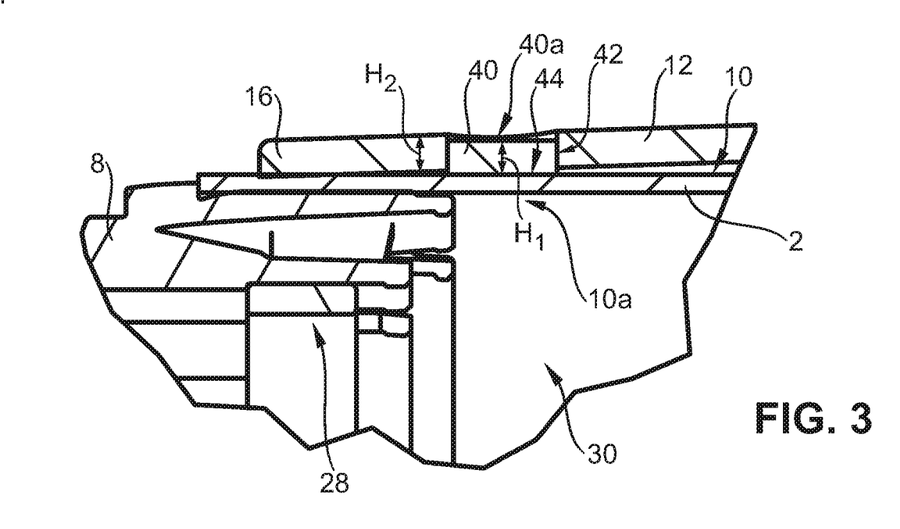
FIG. 3 is a view of the detail B from FIG. 2.

FIGS. 2, 3, as well as 4 and 5 now show two different exemplary embodiments, wherein it is to be understood that individual features of said exemplary embodiments can also be combined. To this extent, the embodiments only represent examples.

Figure 1:
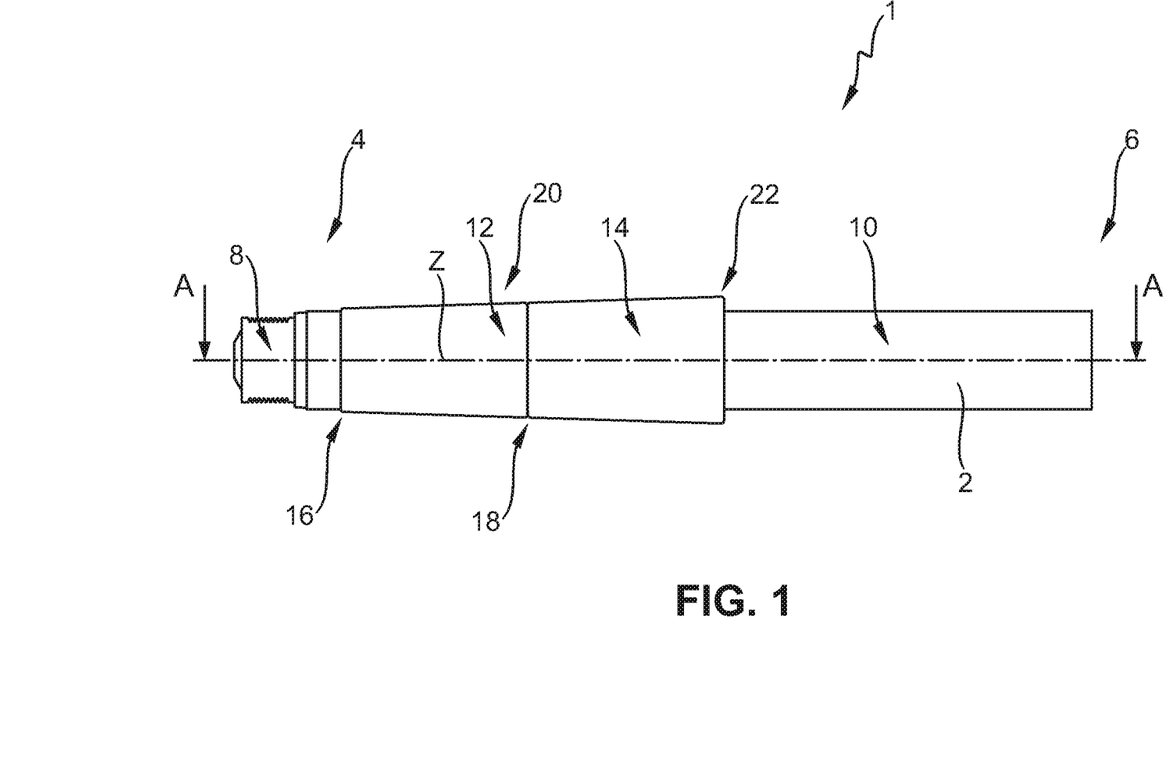
FIG. 1 is a lateral view of a conveyor roller according to the invention.

FIG. 2 shows the conveyor roller 1 from FIG. 1 in the cross section along the section A-A (from FIG. 1). To this extent it can be seen that the second end 6 is embodied so as to be open and a corresponding connector piece 8 can be inserted here. The connector piece 8 furthermore has an axle receptacle 24 which by means of a roller bearing 26 is mounted so as to be rotatable in the connector piece 8. The connector piece 8 per se in a radially inward manner is fixed in the interior 30 of the roller body 2 by way of a connection 28, in that the roller body 2 is rolled inward at the ends 4, 6.

The frustoconical sleeves 12, 14 in this embodiment (FIGS. 2, 3) have in each case one wall 32, 34 which has a consistent wall thickness and to this extent defines in each case one cavity between the external circumferential face 10 of the roller body 2 and the sleeve 12, 14. The sleeves 12, 14 at the respective cone openings 20, 22 are supported and established on the roller body 2 by way of ribs or webs 36, 38, respectively.

A protrusion 40 which extends radially on the roller body 2 and extends into a clearance 42 that is configured in the sleeve 12 is provided in order for the frustoconical sleeve 12 to be axially fixed in this exemplary embodiment (FIGS. 2 and 3). Here, the protrusion 40 is configured as a metal disk which has a height H1 which is less than the height H2 of the frustoconical sleeve 12 at this location. This means that the protrusion 40 does not extend across the circumferential face 13 of the sleeve 12 and thus does not project in an outward manner. It is to be understood that it is not necessary for the clearance 42 to be embodied as a through opening, and the clearance 42 in this exemplary embodiment (FIGS. 2, 3) can likewise be configured as a blind bore which from an internal side of the sleeve 12 extends in a radially outward manner.

According to this exemplary embodiment (FIGS. 2 and 3), the roller body 2 does not have a radially external clearance but is substantially cylindrical on the circumferential face 10 of said roller body 2. When assembling, the protrusion 40 first bears on the face 10 and thus does not yet offer any axial fixing of the sleeve 12. The sleeve 12 is not additionally secured axially by way of a friction-fit on the roller body 2. For the axial fixing according to this embodiment, the protrusion 40 is welded to the roller body 2, in particular by means of resistance welding. A weld seam 44 is formed at the contact location between the external circumferential face 12 and the bearing location of the protrusion 40 on account of the resistance welding. In order for the latter to be carried out, on the one hand, electrodes are preferably placed on the surface 40a of the protrusion, and, on the other hand, on the surface 10a on the internal side of the roller body 2, and a corresponding current is utilized for generating the weld seam 44.

Since the second sleeve 14 bears on the first sleeve 12, the latter is likewise fixed in the direction of the cone tip, thus toward the left with reference to FIG. 2. A support in the direction of the cone opening, thus toward the right with reference to FIG. 2, can be a achieved by way of a ring or a cover cap, as will be explained in more detail with reference to FIGS. 6 to 9. It is at the same time prevented that a breakthrough is provided through the roller body 2, such that the roller body 2 tightly encloses the interior space 30 and oil or grease which can be situated in the interior space 30 cannot leak to the outside, or that no medium can enter the roller interior, respectively.

With reference to FIG. 3 it can furthermore be seen that in the axial direction, that means in the lateral direction of the protrusion 40, the latter bears substantially completely on the internal circumferential face of the clearance 42. This is not mandatory. In order to achieve a positioning it is sufficient for the protrusion 40 to bear on the right side of the clearance 42, with reference to FIG. 3, thus fixing the sleeve 12 in the direction of the cone tip 16. However, better sealing is achieved by the bearing on the entire circumferential face of the clearance 42, and the interior space 36 is also not directly accessible from the outside. Furthermore, any play of the sleeve 12 in the further directions is also prevented, on account of which a noise generation can be avoided when in operation.

Figure 4:
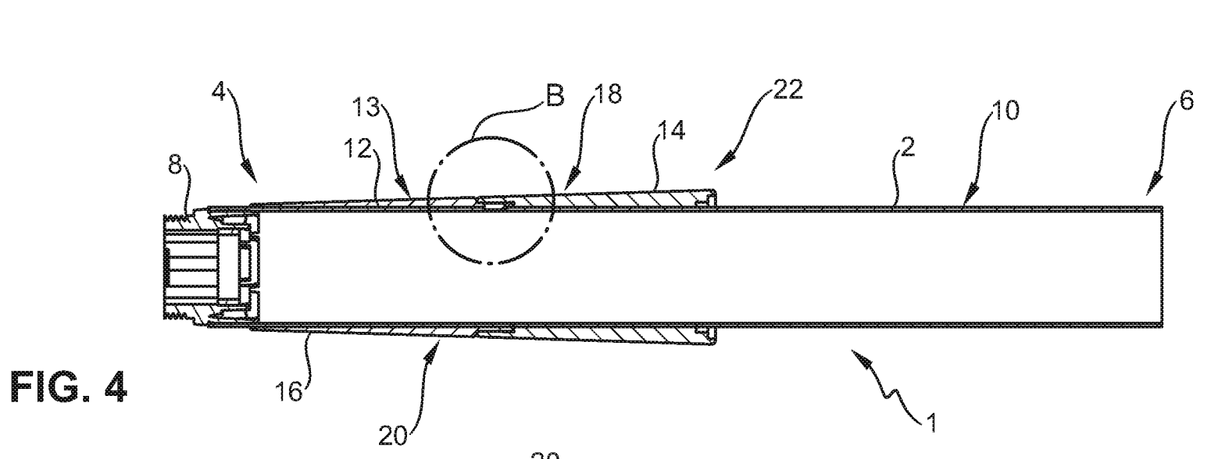
FIG. 4 is a cross section through a conveyor roller according to a second exemplary embodiment.
Figure 5:
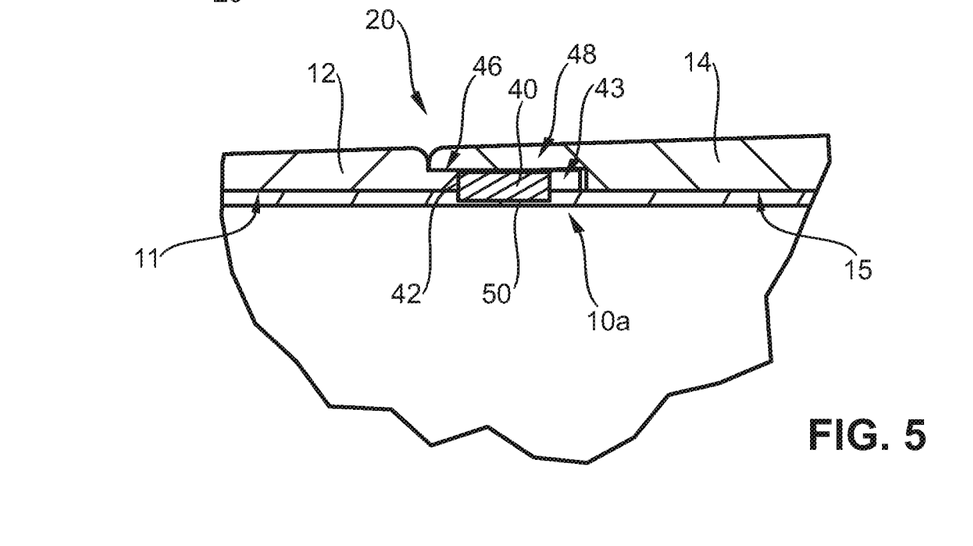
FIG. 5 is a view of the detail B from FIG. 4.

A further exemplary embodiment is shown in FIGS. 4 and 5, wherein it is to be understood that individual features therefrom can be designed in a deviating manner or can be combined or replaced with the features of the first exemplary embodiment of FIGS. 2 and 3.

The exemplary embodiment of FIGS. 4 and 5 is distinguished, on the one hand, in that the clearance 42 and the protrusion 40 are disposed in the region of the cone opening 20 of the first sleeve 12. According to this exemplary embodiment (FIGS. 4 and 5), the sleeve 12 is configured substantially from solid material and by way of the internal surface 11 of the sleeve 12 bears in a substantially planar manner on the external surface 10 of the roller body 2. The sleeve 12 in the region of the cone opening 20 has a flattening 46 such that a portion 48 of the second sleeve 14 extends across the flattening 46 such that the two sleeves 12, 14 bear on one another. The sleeves 12, 14 in this exemplary embodiment, as well as in the first exemplary embodiment, can be formed from any suitable material such as, for instance, metal or plastics material. The sleeves 12, 14 in the first exemplary embodiment are preferably formed from metal, and in the second exemplary embodiment are preferably formed from plastics material.

According to this exemplary embodiment, the protrusion 40 is disposed in a clearance 50 on the roller body 2. The clearance 50 extends partially through the material of the roller body 2 but does not penetrate the internal wall 10a. The clearance 50 is thus configured as a groove having a groove base. With reference to FIGS. 4 and 5, the second sleeve 14 is now disposed from the right on the roller body 2 such that the portion 48 makes its way over the portion 46. The protrusion 40 herein has such a height that said protrusion 40 can be covered by the portion 48. The sleeve 14 is also axially fixed on account of the connection between the sleeve 14 and the sleeve 12.

As opposed to the first exemplary embodiment, the circumferential face 13 of the sleeve 12 is thus completely closed. The clearance 42 in the first exemplary embodiment (FIG. 3) penetrates the circumferential face 13 of the sleeve 12. By contrast, the circumferential face 13 in this exemplary embodiment is completely closed such that the tread face for a belt does not have any comparatively large uneven spots or sharp edges.

It is to be understood also in this exemplary embodiment that the protrusion 40 can additionally be welded to the roller body 2. This can again be performed by means of resistance welding before the sleeve 14 is push-fitted.

This embodiment has the advantage that no protrusion or clearance 40, 42 is visible from the outside, that is to say in a manner external to the sleeves 12, 14, as was the case in the first exemplary embodiment. On account thereof, the conveyor roller 1 overall has a smooth surface, no chatter mark effect whatsoever on conveyed goods, and stress to a conveyor belt by virtue of uneven spots is avoided.

In order for the assembly herein to be designed to be more secure, it can be provided that an assembly safeguard is provided on the clearance 42. Such an assembly safeguard is preferably specified for indicating a defective assembly, in particular, an absence of the protrusion 40. This can be performed in that the sleeves 12, 14 are prevented from connecting, or connecting is indeed possible but the absence of the protrusion 40 is indicated. For example, a lug which conjointly with the protrusion 40 is pushed into the clearance 42 in the assembly is provided on the periphery of the clearance 42. In the absence of the protrusion 40, the lug either prevents the sleeves 12, 14 from being connected, or is folded over and thus projects from the joint of the two sleeves 12, 14 and is correspondingly visible. Quality control is thus simplified.

Figure 6:
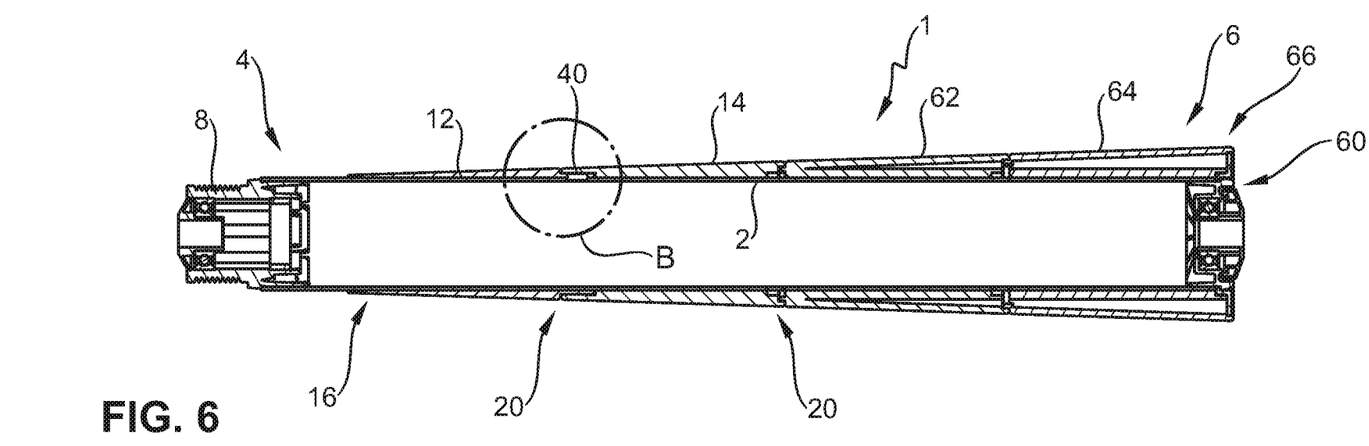
FIG. 6 is an illustration of the conveyor roller from FIG. 4, having four frustoconical sleeves.
Figure 7:
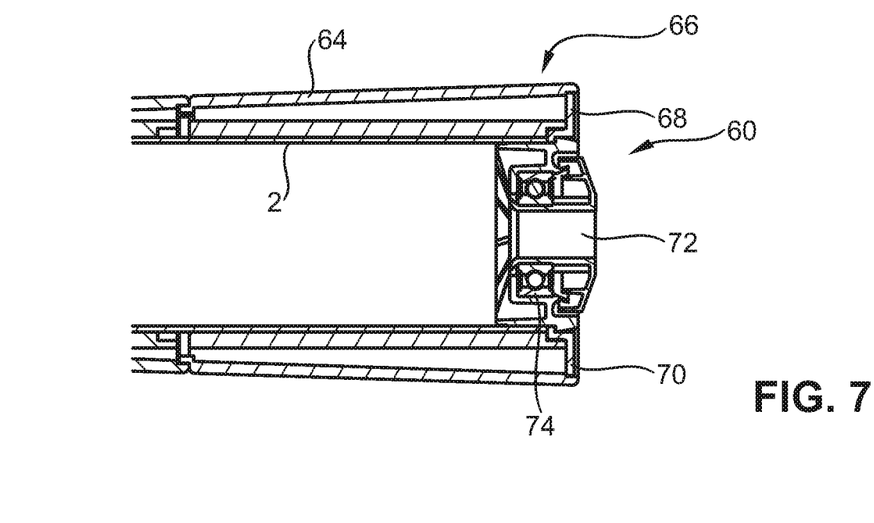
FIG. 7 is a view of the detail from FIG. 6.
Figures 8, 9:
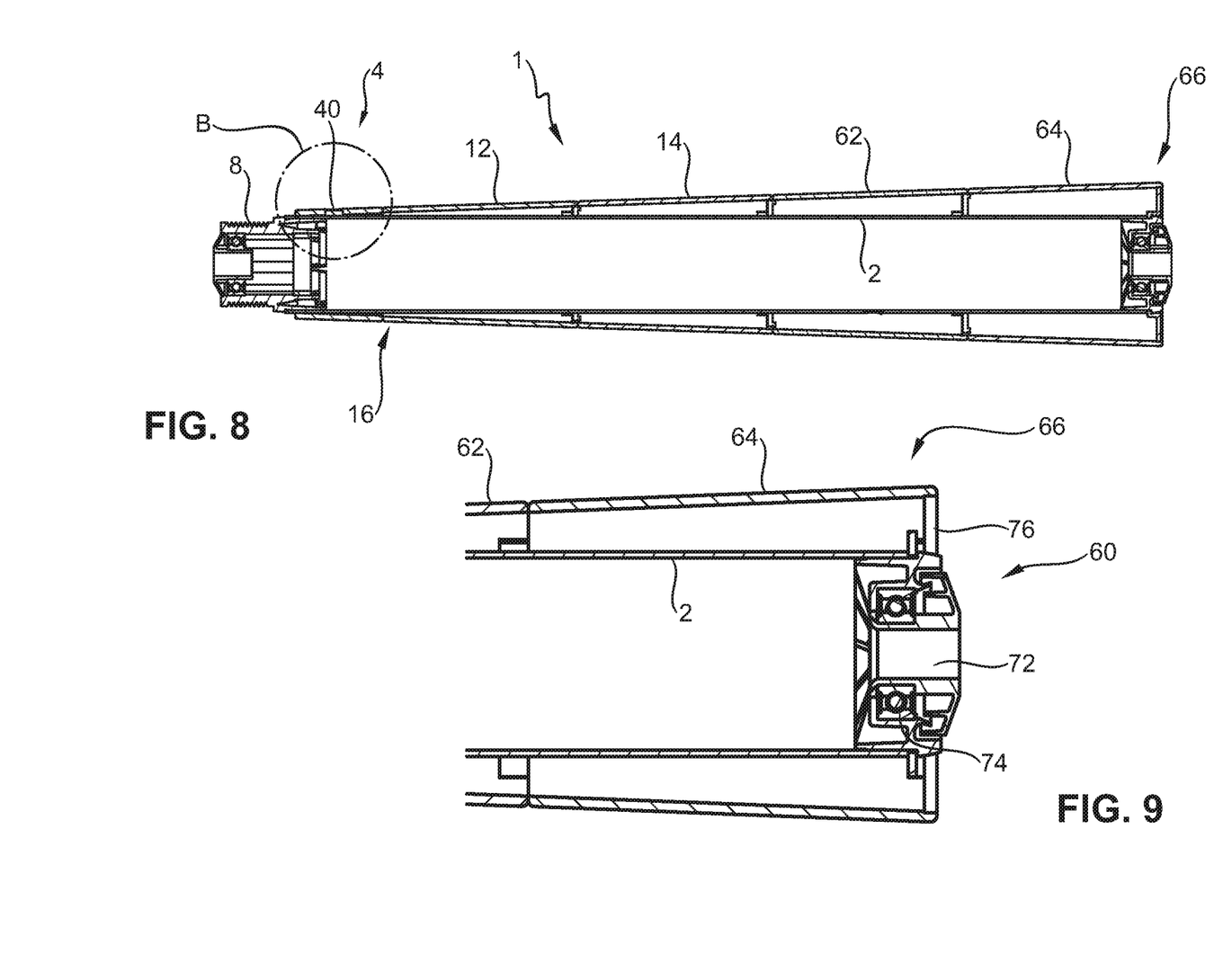
FIG. 8 is a cross section through a conveyor roller according to a third exemplary embodiment, having the positioning installation of the first exemplary embodiment.
FIG. 9 is a detail having an alternative connector piece.

FIGS. 6 and 8 illustrate conveyor rollers 1 having four sleeves 12, 14, 62, 64. The detail B from FIG. 6 corresponds to the detail shown in FIG. 5 and reference to this extent is made to the above. The sleeves 62, 64 directly adjoin the sleeve 14 and by way of the protrusion 40 are supported in the direction of the cone tip, thus with reference to FIG. 6 toward the left. The sleeves 12, 14, 62, 64 in the direction of the cone openings 20, 22 are supported by way of the sleeve 64 which, according to FIGS. 6 and 7, by way of the end 66 is supported on a cover cap 68. The cover cap 68 has a radially extending collar 70 which provides radial as well as axial support. The cover cap 68 is held by way of a connector piece 60 which has an axle receptacle 72 which sits in a roller bearing 74.

A variant thereto is shown in FIG. 8. The detail B from FIG. 8 corresponds to the detail which is illustrated in FIG. 3. Four sleeves 12, 14, 62, 64 are also provided in the embodiment illustrated in FIG. 8, wherein the support toward the cone tip is implemented by way of the protrusion 40 that is connected in a materially integral manner to the roller body 2. The sleeves 24 and 62 herein are also without any dedicated support but are supported by way of the sleeves 12 and 64.

FIG. 9 illustrates an alternative connector piece 60. A dedicated disk 76, not a cover cap of the connector piece 68, is utilized as support at the end 6 in this exemplary embodiment (FIG. 9). The disk 76 in a radially inward manner is press-fitted onto the roller body 2 or a portion of the connector piece 68 and supports the sleeve 64 in a radially external manner. In the exemplary embodiment shown in FIGS. 8 and 9 the inclination of the sleeves 12, 14, 62, 64 is moreover somewhat greater and is approximately 2.2°. This type of support can be used, according to requirements, in the embodiments according to FIGS. 6 and 8 as a variant to the finish piece 60 illustrated in FIG. 7.

The invention claimed is:

1. A conveyor roller for conveyor systems for conveying articles comprising:
   a cylindrical roller body having a rotation axis, the cylindrical roller body being adapted for rotatable assembly in a frame;
   a first frustoconical sleeve disposed on the cylindrical roller body; and
   a positioning installation comprising a protrusion extending radially outward from the cylindrical roller body, wherein the protrusion is inserted in a first clearance in an external surface of the cylindrical roller body and a second clearance in the first frustoconical sleeve and whereby the first frustoconical sleeve is axially fixed at least along the rotation axis in at least one direction;
   wherein the protrusion extends outward without establishing a fluidic connection between an interior space of the cylindrical roller body and the environment; and
   wherein the positioning installation fixed the frustoconical sleeve in a form-fitting manner.

2. The conveyor roller as claimed in claim 1, wherein the first clearance or the second clearance comprises a groove having a groove base.

3. A conveyor roller for conveyor systems for conveying articles comprising:
   a cylindrical roller body having a rotation axis, the cylindrical roller body being adapted for rotatable assembly in a frame;
   a first frustoconical sleeve disposed on the cylindrical roller body; and
   a positioning installation comprising a protrusion extending radially outward from the cylindrical roller body, wherein the protrusion is inserted in a first clearance in an external surface of the cylindrical roller body and a second clearance in the first frustoconical sleeve and whereby the first frustoconical sleeve is axially fixed at least along the rotation axis in at least one direction, wherein the first clearance, the second clearance, and the protrusion are disposed in a widened region of the first frustoconical sleeve.

4. A conveyor roller for conveyor systems for conveying articles comprising:
   a cylindrical roller body having a rotation axis, the cylindrical roller body being adapted for rotatable assembly in a frame;
   a first frustoconical sleeve disposed on the cylindrical roller body; and
   a positioning installation comprising a protrusion extending radially outward from the cylindrical roller body, wherein the protrusion is inserted in a first clearance in an external surface of the cylindrical roller body and a second clearance in the first frustoconical sleeve and whereby the first frustoconical sleeve is axially fixed at least along the rotation axis in at least one direction, wherein the first clearance, the second clearance, and the protrusion are radially covered by a second frustoconical sleeve which is disposed on and adjoins the first frustoconical sleeve on the cylindrical roller body.

\* \* \* \* \*

UNITED STATES PATENT AND TRADEMARK OFFICE
CERTIFICATE OF CORRECTION

| | |
|---|---|
| PATENT NO. | : 11,214,445 B2 |
| APPLICATION NO. | : 16/470993 |
| DATED | : January 4, 2022 |
| INVENTOR(S) | : Langensiepen et al. |

It is certified that error appears in the above-identified patent and that said Letters Patent is hereby corrected as shown below:

In the Claims

Column 10, Claim 1, Line 11, "fixed" should be --fixes--.

Signed and Sealed this
Seventeenth Day of May, 2022

Katherine Kelly Vidal
*Director of the United States Patent and Trademark Office*